US006349202B1

(12) United States Patent
Odamura

(10) Patent No.: US 6,349,202 B1
(45) Date of Patent: Feb. 19, 2002

(54) METHOD OF STORING AND TRANSMITTING MARKUP LANGUAGE DOCUMENTS IN A MOBILE RADIO COMMUNICATIONS SYSTEM

(75) Inventor: Satoshi Odamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/204,689

(22) Filed: Dec. 3, 1998

(30) Foreign Application Priority Data

Dec. 3, 1997 (JP) ............................................ 9-333278

(51) Int. Cl.[7] ................................................ H04B 1/16
(52) U.S. Cl. ..................... 455/412; 455/186.1; 707/501
(58) Field of Search .............................. 455/38.1–38.5, 455/70, 186.1, 550, 525, 466, 414, 426, 68, 39.3, 32.1, 88, 412; 379/57, 88, 96, 97; 340/825.44, 825.22; 707/501, 513; 709/201–203, 229, 231, 217

(56) References Cited

U.S. PATENT DOCUMENTS 5,561,702 A * 10/1996 Lipp et al. .................... 379/57
5,745,360 A 4/1998 Leone et al.
5,973,681 A * 10/1999 Tanigawa et al. ........... 345/327
5,987,029 A * 11/1999 Kotani et al. ............... 370/389
6,061,106 A * 1/2000 Ohtsuki ................. 340/825.44
6,021,307 A * 2/2000 Chan .......................... 455/3.1
6,081,815 A * 6/2000 Spitznagel et al. ......... 707/501
6,091,808 A * 7/2000 Wood et al. ................ 379/201
6,097,935 A * 8/2000 Takahashi et al. ....... 455/186.1
6,100,824 A * 8/2000 MacLeod et al. ............. 341/51
6,115,384 A * 9/2000 Parzych ...................... 370/401
6,130,933 A * 10/2000 Miloslavsky ............. 379/90.01
6,131,037 A * 10/2000 Flippo et al. ............... 455/503
6,131,067 A * 10/2000 Girerd et al. ............... 701/213

FOREIGN PATENT DOCUMENTS

EP 0 691 619 A2 6/1995

* cited by examiner

*Primary Examiner*—Daniel Hunter
*Assistant Examiner*—Pablo Tran
(74) *Attorney, Agent, or Firm*—Scully, Scott, Murphy & Presser

(57) ABSTRACT

In order to effectively use a limited memory capacity of a mobile radio unit when storing a markup language document transmitted thereto, a lookup table, which includes a plurality of pairs of tags and shortened codes thereof, is memorized in the mobile radio unit. Thereafter, the mobile radio unit receives a message transmitted thereto. In the case where the incoming message is a markup language document, the mobile radio unit determines if a tag embedded in the markup language document has a corresponding shortened code in the lookup table. If the tag has the corresponding shortened tag in the lookup table, the markup language document is stored in the mobile radio unit while replacing the tag by the corresponding shortened code.

15 Claims, 5 Drawing Sheets

METHOD OF STORING AND TRANSMITTING MARKUP LANGUAGE DOCUMENTS IN A MOBILE RADIO COMMUNICATIONS SYSTEM

BACKGROUND OF THE INVENTION

1. Field of the Invention

The present invention relates generally to a method of effectively storing markup language documents, such as HTML (hypertext markup language) documents, and more specifically to a method of transmitting markup language documents at a relatively high speed. The present invention has found an extensive use in a mobile radio unit which has a limited memory capacity.

2. Description of the Related Art

As is known in the art, HTTP (hypertext transfer protocol) enables, on the World Wide Web (WWW), the user to send and retrieve files across the Internet. HTTP allows the author of a Web page to embed hyperlinks to other Web sites. On the other hand, HTML is the universal codes which are used for the WWW to instruct a Web browser how a document is to be managed and displayed.

In HTML, a code termed "tags" is used to identify an element in a document, such as a heading or a paragraph, for the purposes of formatting, indexing, and linking information in the document. The HTML document thus usually includes a lot of tags and hence, the size of the document is liable to become considerably large. Therefore, when a mobile radio unit, which is inherently provided with a limited memory space, receives and transmits the markup language documents, there occur difficulties that the whole document is unable to be stored in the mobile unit.

SUMMARY OF THE INVENTION

It is therefore an object of the present invention to provide a method of effectively or compactly storing markup language documents.

Another object of the present invention is to provide a method of transmitting markup language documents at a relatively high speed.

In brief, these objects are achieved by techniques wherein in order to effectively use a limited memory capacity of a mobile radio unit when storing a markup language document transmitted thereto, a lookup table, which includes a plurality of pairs of tags and shortened codes thereof, is memorized in the mobile radio unit. Thereafter, the mobile radio unit receives a message transmitted thereto. In the case where the incoming message is a markup language document, the mobile radio unit determines if a tag embedded in the markup language document has a corresponding shortened code in the lookup table. If the tag has the corresponding shortened code in the lookup table, the markup language document is stored in the mobile radio unit while replacing the tag by the corresponding shortened code.

One aspect of the present invention resides in a method of storing a markup language document in a mobile radio unit, comprising the steps of: (a) storing, in memory means of said mobile radio unit, a lookup table including a plurality of pairs of tags and shortened codes thereof; (b) receiving, at said mobile radio unit, a message transmitted thereto; (c) determining, in case said message is a markup language document, if a tag embedded in said markup language document has a corresponding shortened code in said lookup table; and (d) storing, in said memory means, said markup language document, in which if said tag has the corresponding shortened code in said lookup table, said tag has been replaced by said corresponding shortened code.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

The principle underlying the present invention is that each of the tags, embedded in a markup language document, is converted into a shorter code when to be stored. Further, when the document is to be transmitted, each tag embedded therein takes the form of the above-mentioned shorter code as much as possible.

A first embodiment of the present invention will be described with reference to FIGS. 1–3.

Figure 1:
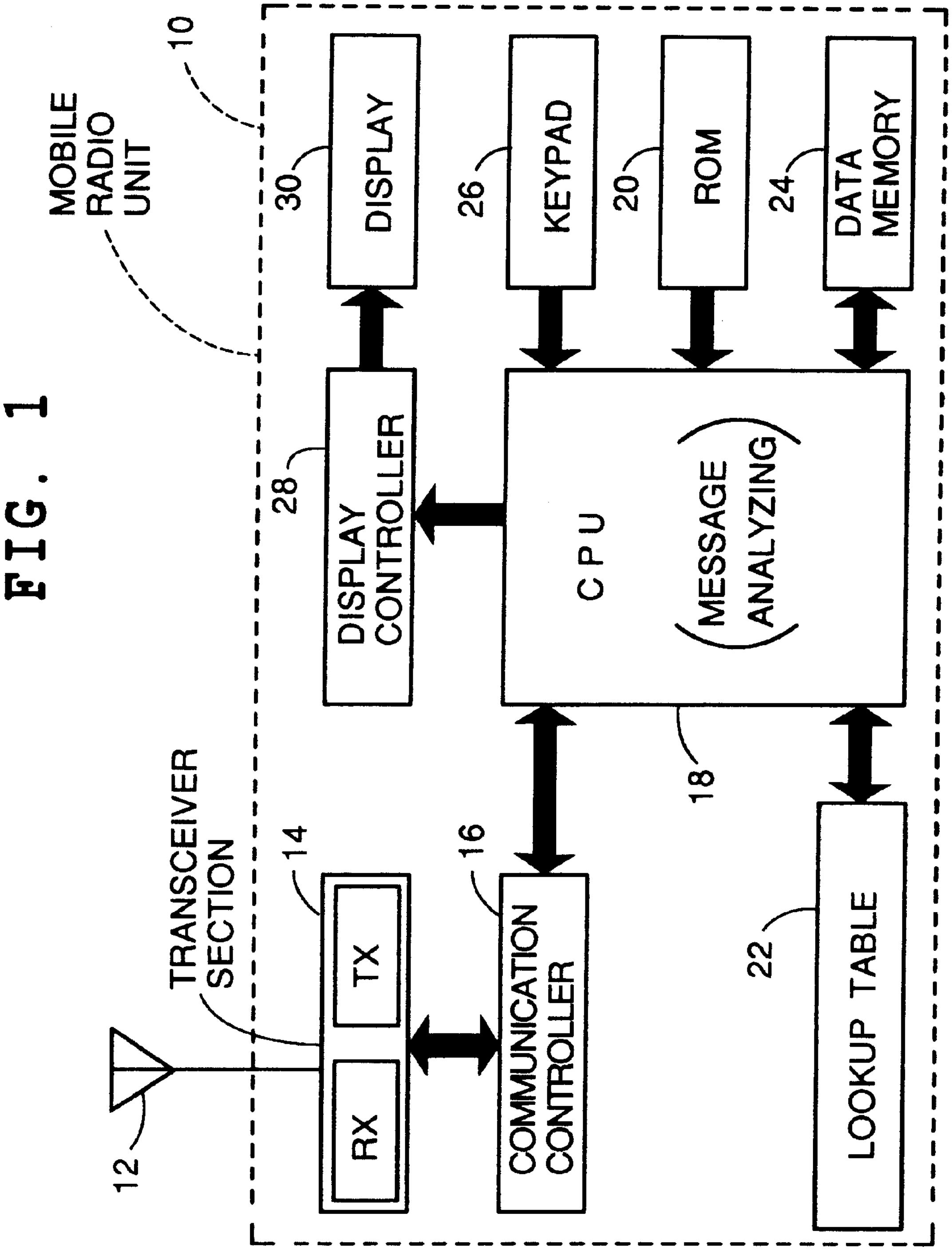
FIG. 1 is a block diagram schematically showing a mobile radio unit to which the present invention is applicable.

FIG. 1 is a block diagram schematically showing one example of a mobile radio unit 10 to which the present invention is preferable applicable. The mobile unit 10 may be a mobile telephone terminal. However, the instant invention is also applicable to a one-way communication terminal such as a radio pager (for example). Assuming that the mobile unit 10 has already stored a suitable Web browser via which the unit 10 is able to communicate with Web sites via the Internet.

The mobile radio unit 10 per se is a conventional one. Further, the communication via the Internet is also well known. Accordingly, the detailed descriptions thereof will be omitted for the sake of simplifying the disclosure.

The unit 10 is provided with an antenna 12 via which the unit 10 is able to communicate with the external world, such as a network base station and another mobile unit (both not shown). The antenna 12 is coupled, via a duplexer (not shown), to a transceiver section 14 that includes a receiver RX and a transmitter TX. A communication controller 16 is provided for controlling digital data communications in accordance with a suitable transfer protocol stored in the mobile unit 10. A central processing unit (CPU) 18 controls the overall operation of the mobile unit 10 using a program stored in a ROM (random access memory) 20. The operation of the CPU 18, which is most relevant to the present invention, is to analyze an incoming or outgoing message. That is, the CPU 18 picks up tags embedded in the documents and converts them into corresponding short codes by referring to a lookup table 22. Further, the mobile unit 10 comprises a data memory 24, a keypad 26, a display controller 28, and a display 30. The data memory 24 is provided for storing various messages which include the markup language documents relevant to the present invention.

Figure 2:
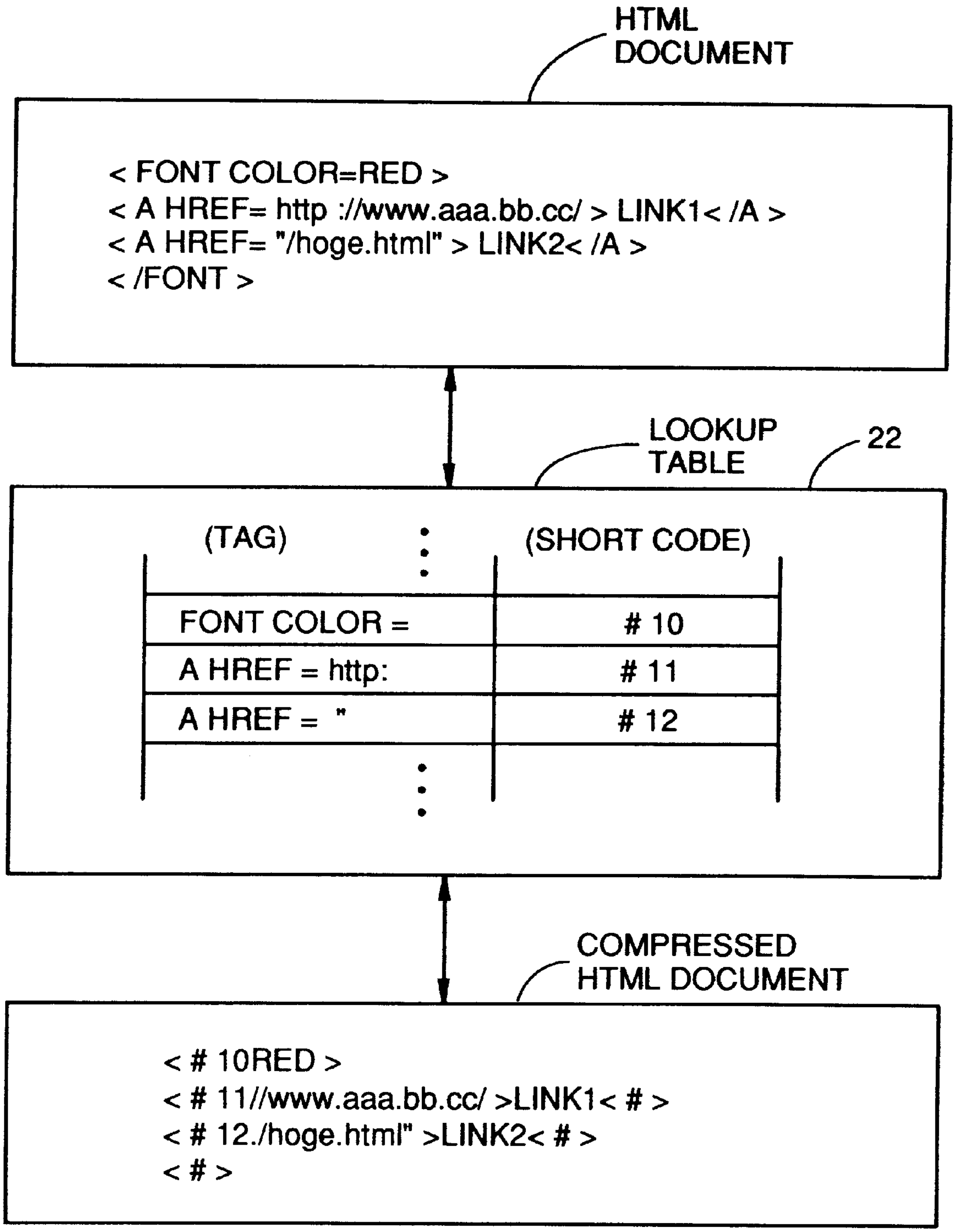
FIG. 2 is a drawing showing examples of HTML document and compressed HTML document together with a lookup table used to compress the document.
Figure 3:
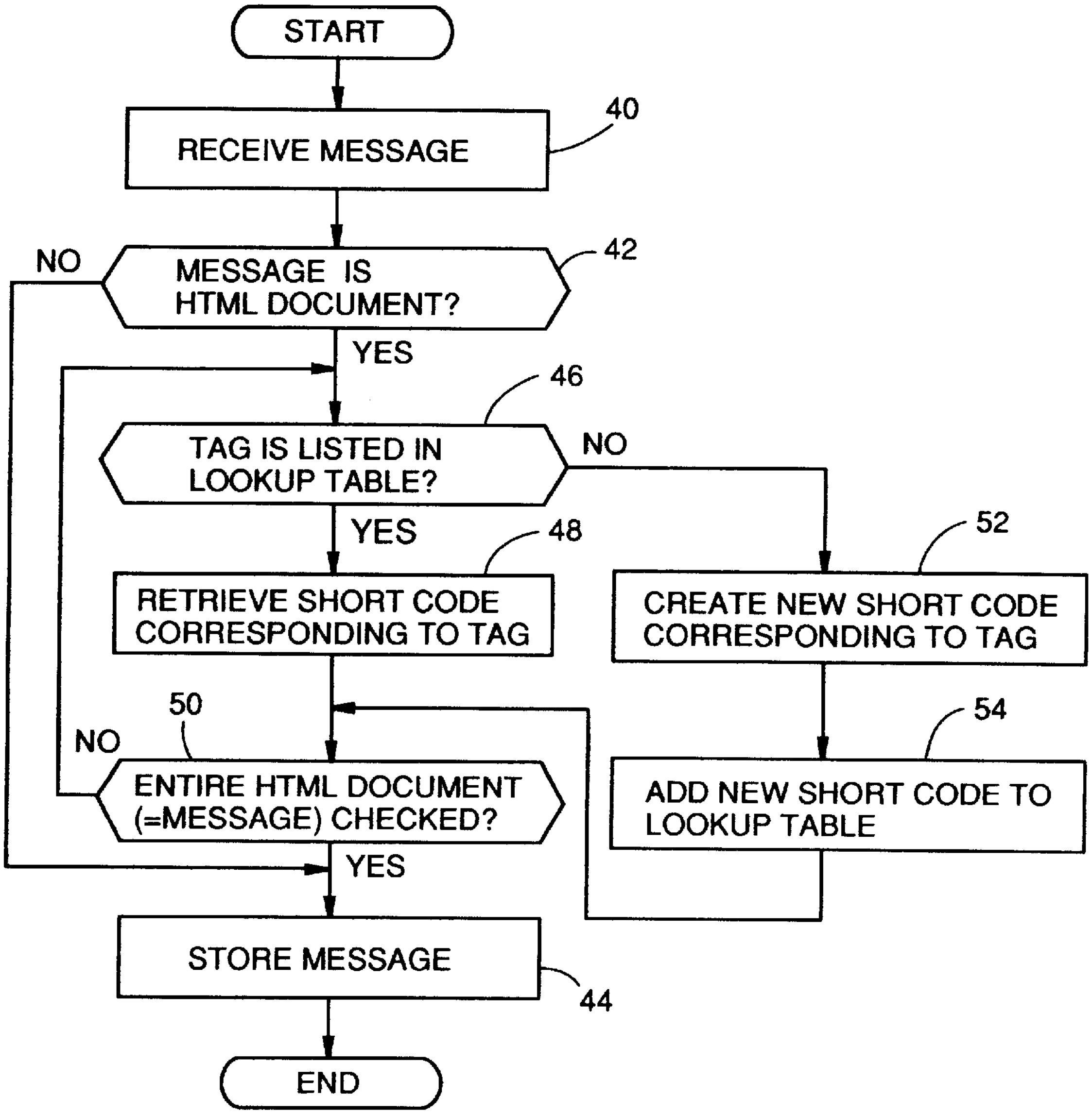
FIG. 3 is a flow chart which includes steps which characterize the operation of a first embodiment of the present invention.

FIG. 2 shows one example wherein an HTML document is compressed or converted into a corresponding shorter document using the lookup table 22. In this case, the table 22 has already stored three tags and the corresponding short (or shorten) codes. As mentioned above, the CPU 18 ascertains the tags and converted them into respective short codes using the lookup table 22.

The operation of the first embodiment will further be described with reference to the flow chart of FIG. 3. Assuming that the mobile unit 10 has already established communications with the Internet and receives a message at step 40. At step 42, a check is made to determine if the message received is the HTML document. If the answer made at step 42 is negative (NO), the routine goes to step 44 at which the message is stored in the data memory 24. Otherwise (viz., the answer to the inquiry at step 42 is YES), the CPU 18 checks to determine if a first tag is listed in the lookup table 22. If the answer at step 46 is affirmative, the program proceeds to step 48 at which the short code corresponding to the first tag is retrieved from the lookup table 22. Subsequently, at step 50, a check is made to determine if the entire HTML document in question has been checked in terms of tags. If the answer to the inquiry at step 50 is NO, the routine goes back to step 46.

On the other hand, if the answer at step 46 is negative (NO), a new short code that corresponds to the tag checked at step 46 is created by the CPU 18 at step 52. Subsequently, at step 54, the new short code is added to the lookup table.

A second embodiment of the present invention will be described with reference to FIGS. 4 and 5. In the second embodiment, one of two mobile radio units, each of which is configured as shown in FIG. 1, transmits the HTML document to the other. For the convenience of description, it is assumed that a mobile unit A transmits a message to a mobile unit B (see FIGS. 4 and 5). The important point of the second embodiment is that each of the two mobile units (in this particular case) has already stored the same lookup table.

Figure 4:
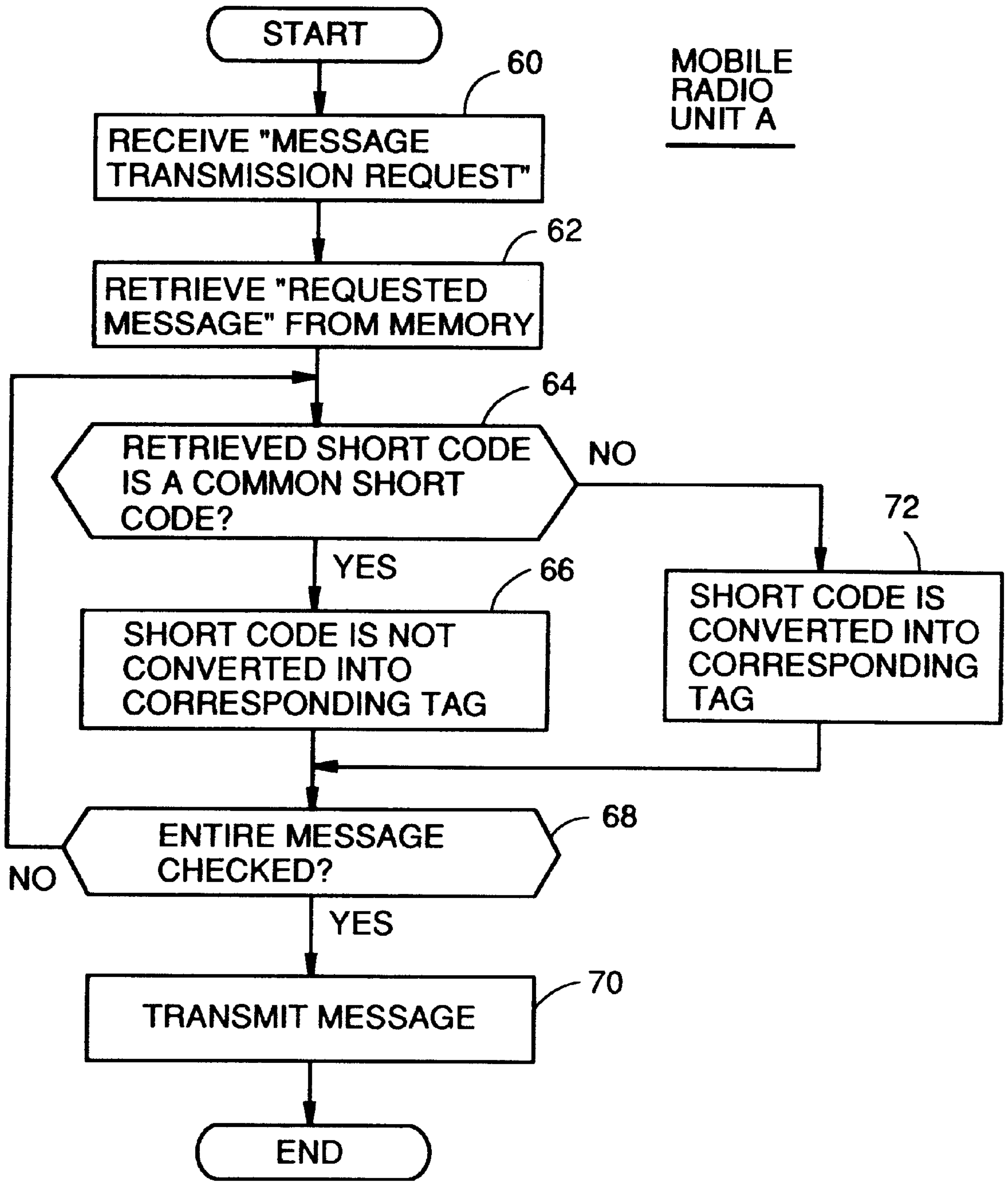
FIGS. 4 and 5 are each flow charts which include steps which characterize the operation of a second embodiment of the present invention.

Referring to FIG. 4, at step 60, the mobile unit A receives a message transmission request from the mobile unit B. In response to this, at step 62, the unit A retrieves the requested document from a data memory provided therein (corresponding to the memory 24 of FIG. 1). At step 64, a check is made to determine if a first tag (at this time point) embedded in the retrieved document has a short code which is common to both the mobile units A and B. If Yes at step 64, the short code, embedded in the document retrieved from the memory, is not converted into the tag (step 66) and is stored in a suitable work space of the mobile unit A. Following this, if the retrieved message has not yet entirely been checked or searched (step 68), the routine goes back to step 64. Otherwise, the message is transmitted to the mobile unit B at step 70. In the above, if the answer to the inquiry at steps 64 is negative, the routine proceeds to step 72 at which the short code, which is not common to both the mobile units A and B, is converted back to the corresponding tag. Thereafter, the program goes to step 68.

Figure 5:
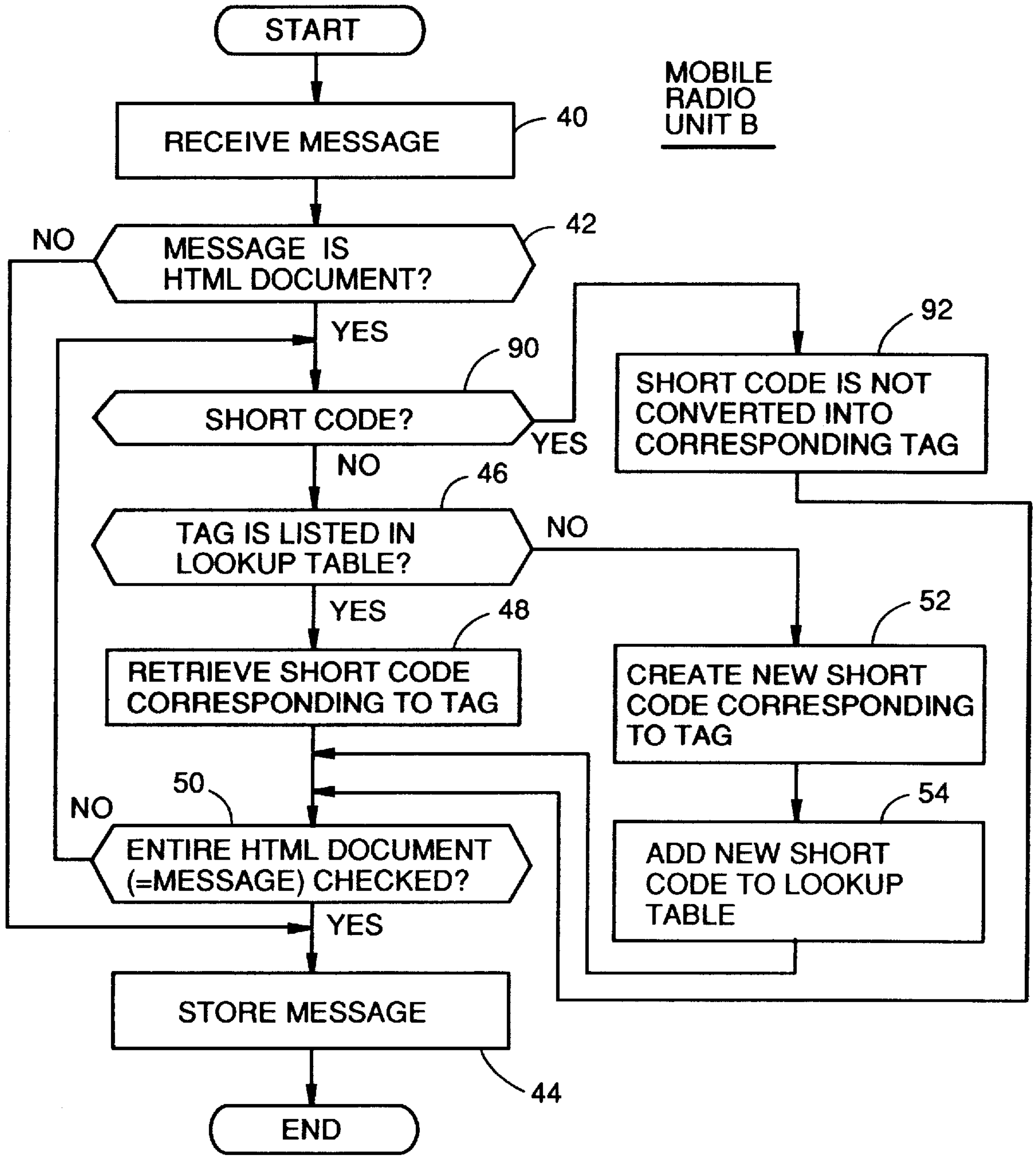

FIG. 5 shows the operation at the side of the mobile unit B. The flow chart of FIG. 5 is identical with that of FIG. 3 except that the flow chart of FIG. 5 is further provided with two steps 90 and 92. If the short code is transmitted from the mobile unit A (step 90), it is understood that the short code should not be converted into the original tag (step 92). The remaining steps are identical with those shown in FIG. 3 and thus, it is believed that no description is necessary.

It will be understood that the above disclosure is representative of only two possible embodiments of the present invention and that the concept on which the invention is based in not specifically limited thereto.

What is claimed is:

1. A method of storing a markup language document in a mobile radio unit, comprising the steps of:

(a) storing, in memory means of said mobile radio unit, a lookup table including a plurality of pairs of tags and shortened codes thereof;

(b) receiving, at said mobile radio unit, a message transmitted thereto;

(c) determining, in case said message is a markup language document, if a tag embedded in said markup language document has a corresponding shortened code in said lookup table; and (d) storing, in said memory means, said markup language document, in which if said tag has the corresponding shortened code in said lookup table, said tag has been replaced by said corresponding shortened code.

2. A method as claimed in claim 1, wherein if said tag has no corresponding shortened code in said lookup table, a shortened code corresponding to said tag is created and added to said lookup table.

3. A method as claimed in claim 1, wherein said mobile radio unit is a mobile telephone terminal or a pager.

4. A method as claimed in claim 2, wherein said mobile radio unit is a mobile telephone terminal or a pager.

5. A method of storing a markup language document in a mobile radio unit, comprising the steps of:

(a) receiving, at said mobile radio unit, a message transmitted thereto;

(b) determining if said message is a markup language document;

(c) determining, if said message has been ascertained as a markup language document, if a tag embedded in said markup language document has a corresponding shortened code in a lookup table, said lookup table having been stored in said mobile radio unit and comprising a plurality of pairs of tags and shortened codes thereof;

(d) retrieving a shortened code, corresponding to said tag, from the lookup table if the tag has been ascertained as having a corresponding shortened code in the lookup table in step (c); and (e) storing, in said mobile radio unit, said markup language document wherein said tag has been replaced by said corresponding shortened code.

6. A method as claimed in claim 5, wherein if said tag has no corresponding shortened code in the lookup table, a shortened code corresponding to said tag is created and added to the lookup table, thereby establishing a new pair of tag and shortened code thereof in the lookup table.

7. A method as claimed in claim 5, wherein said mobile radio unit is a mobile telephone terminal or a pager.

8. A method as claimed in claim 6, wherein said mobile radio unit is a mobile telephone terminal or a pager.

9. A method as claimed in claim 5, wherein in the case where a plurality of tags are embedded in the markup language document, steps (c) and (d) are repeated until all the tags have been checked if each tag has a corresponding shortened code in the lookup table.

10. A method as claimed in claim 5, further comprising the steps of:

(f) determining, if said message has been ascertained as a markup language document at step (b), if a shortened code representative of a tag is embedded in the markup language document; and (g) retaining said shortened code in said markup language document if the shortened code has been determined as being embedded in the markup language document at step (f) and proceeding to step (d).

11. A method of transmitting and receiving a markup language between two mobile radio units, comprising the steps of:

(a) storing, at a plurality of mobile radio units, lookup tables respectively containing a plurality of identical pairs of tags and shortened codes thereof;

(b) preparing, at a first mobile radio unit, a message to be transmitted therefrom;

(c) determining if a shortened code embedded n the message to be transmitted is a code which is listed in the lookup table stored in the first mobile radio unit;

(d) performing no conversion of said shortened code to a corresponding tag if said shortened code is the code which is listed in the lookup table stored in the first mobile radio unit;

(e) converting said shortened code to a corresponding tag if said shortened code embedded in the message to be transmitted is the code which is not listed in the lookup table stored in the first mobile radio unit; and (f) transmitting the message prepared at step (b) by way of step (d) or (e).

12. A method as claimed in claim 11, further comprising, at a second mobile radio unit to which the message is transmitted from said first mobile unit, the steps of:

(g) receiving the message transmitted to said second mobile radio unit;

(h) determining if said message is a markup language document;

(i) determining, if said message has been ascertained as a markup language document at step (h), if a shortened code is embedded in the markup language document;

(j) retaining said shortened code in said markup language document if the shortened code has been determined as being embedded in the markup language document at step (i);

(k) determining if a tag embedded in said markup language document has a corresponding shortened code in the lookup tables stored in said second mobile radio unit;

(l) retrieving a shortened code, corresponding to said tag, from the lookup table if the tag has been ascertained as having a corresponding code in the lookup table in step (k); and (m) storing, in said mobile radio unit, said markup language document wherein said tag has been replaced by said corresponding shortened code.

13. A method as claimed in claim 12, wherein if said tag has no corresponding shortened code in the lookup table, a shortened code corresponding to said tag is created and added to the lookup table, thereby establishing a new pair of tag and shortened code thereof in the lookup table.

14. A method as claimed in claim 12, wherein said mobile radio unit is a mobile telephone terminal or a pager.

15. A method as claimed in claim 13, wherein said mobile radio unit is a mobile telephone terminal or a pager.

* * * * *